United States Patent
Watabe et al.

(10) Patent No.: US 9,587,708 B2
(45) Date of Patent: Mar. 7, 2017

(54) AUTOMATIC HEAT TREATMENT METHOD FOR METAL RING

(75) Inventors: Yoshiharu Watabe, Tochigi (JP); Masaomi Saruyama, Tochigi (JP); Hiroyuki Tsuyuzaki, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 1277 days.

(21) Appl. No.: 13/133,024

(22) PCT Filed: Mar. 8, 2010

(86) PCT No.: PCT/JP2010/053778
§ 371 (c)(1),
(2), (4) Date: Jun. 29, 2011

(87) PCT Pub. No.: WO2010/110037
PCT Pub. Date: Sep. 30, 2010

(65) Prior Publication Data
US 2012/0000265 A1    Jan. 5, 2012

(30) Foreign Application Priority Data

Mar. 26, 2009  (JP) ................. 2009-076137
Mar. 26, 2009  (JP) ................. 2009-076153
Mar. 26, 2009  (JP) ................. 2009-076161

(51) Int. Cl.
C21D 9/40    (2006.01)
C21D 9/00    (2006.01)
F16G 5/16    (2006.01)

(52) U.S. Cl.
CPC ............. *F16G 5/16* (2013.01); *C21D 9/0018* (2013.01); *C21D 9/0025* (2013.01); *C21D 9/40* (2013.01)

(58) Field of Classification Search
CPC   Y10T 29/49998; B21D 53/045; B21D 26/14; B21D 26/033; B21D 53/821;
(Continued)

(56) References Cited

U.S. PATENT DOCUMENTS 1,779,911 A * 10/1930 Litle, Jr. ................. 29/890.035
3,790,336 A *  2/1974 Brede et al. ................. 432/163
(Continued)

FOREIGN PATENT DOCUMENTS

JP   2002-161314 A   6/2002
JP   2005-042159 A   2/2005
(Continued)

*Primary Examiner* — David Bryant
*Assistant Examiner* — Lawrence Averick
(74) *Attorney, Agent, or Firm* — Carrier Blackman & Associates, P.C.; Joseph P. Carrier; Jeffrey T. Gedeon

(57) ABSTRACT

In an alignment stocker having an opening and plural shelf members, metal rings are pushed between the plural shelf members. The meta rings are deformed into an approximately polygonal shape to pass through the opening, in an arranged State of the metal rings, by pressing and holding from insides thereof, and are extracted from the opening. Using a heat treatment jig, which has the same opening as that of the shelf member and enables the metal rings to be mounted parallel to each other in a vertical direction and to be spaced the predetermined interval from each other, the metal rings held from the insides thereof in the arranged state, are inserted from the opening of the heat treatment jig into the heat treatment jig, are mounted in the heat treatment jig by releasing the inside holding, and then are heated and extracted from the shelf members.

3 Claims, 14 Drawing Sheets

(58) Field of Classification Search
CPC ..... B21B 5/00; B21J 5/00; C21D 9/40; C21D 9/46; C21D 9/0018; C21D 9/0025; B24B 37/345; B24B 41/005; B24B 9/102; B23K 37/0408; B22D 41/015; A21B 1/48; F27B 9/142; F27B 9/22; F16G 5/16
USPC ........ 72/54, 56, 61, 111, 364; 148/589, 604, 148/656; 451/332, 333, 336, 339; 29/281.1; 432/9, 121, 125, 126, 253; 266/249

See application file for complete search history.

(56) References Cited

U.S. PATENT DOCUMENTS

| | | | |
|---|---|---|---|
| 6,048,418 A * | 4/2000 | Canner | 148/589 |
| 2004/0020257 A1 | 2/2004 | Sato et al. | |
| 2006/0199133 A1 | 9/2006 | Kobayashi | |

FOREIGN PATENT DOCUMENTS

| | | | |
|---|---|---|---|
| JP | 2007-191788 A | 8/2007 |
| JP | 2008-240085 A | 10/2008 |
| JP | 2008-240086 A | 10/2008 |
| JP | 4219186 B2 | 2/2009 |

* cited by examiner

AUTOMATIC HEAT TREATMENT METHOD FOR METAL RING

TECHNICAL FIELD

The present invention relates to a method for performing heat treatment on metal rings in endless metal belts, which are used for Continuously Variable Transmission (CVT) or the like, automatically and in large numbers.

BACKGROUND ART

An endless metal belt is wound around a pair of pulleys in CVT used as a transmission in automobiles and the like. This endless metal belt is formed such that plural endless belt-like metal rings, of which circumference lengths are slightly different from each other, are stacked in a thickness direction, a pair of stacked metal rings is engaged with each other from a width direction, and many plate-like elements are annularly disposed toward each other in a thickness direction.

The above metal ring is produced as follows. First, opposite ends of a thin plate made of a steel material of maraging steel, stainless steel, or the like are welded, so that the thin plate is formed into a cylindrical shape. In this case, since a portion of steel material becomes hardened by welding heat, this cylindrical steel material is subjected to solution treatment, thereby being homogenized. Next, the cylindrical steel material subjected to the solution treatment is cut by a predetermined width, endless belt-like rings are thereby formed, and each ring is subjected to rolling so as to have a predetermined thickness. Since metal structures of the rings are deformed by the rolling, the rings subjected to the rolling are subjected to solution treatment again, so that the metal structures are recrystallized. After that, each ring subjected to the solution treatment is adjusted so as to have a predetermined circumference length, and metal rings, of which circumference lengths are slightly different from each other, are produced. Each metal ring is subjected to aging treatment and nitriding treatment, so that hardness and wear resistance thereof are improved.

A gas nitriding method, a gas soft-nitriding method, a salt bath nitriding method, and or the like, in which metal rings are held in a predetermined atmosphere for a time period, have been known as the above nitriding treatment. In the gas nitriding method and the gas soft-nitriding method, the whole metal ring is desirably exposed to a predetermined atmosphere, so that the metal ring is uniformly nitrided.

In this nitriding treatment for metal rings, a jig is used for holding many metal rings and nitriding the metal rings simultaneously. Specifically, a nitriding treatment jig for metal rings has been proposed as disclosed in, for example, Japanese Unexamined Patent Application Publication No. 2002-161314. In this nitriding treatment jig, the metal rings are suspended from an inner periphery side to a vertical direction by a pair of suspending devices provided at an upper side and a lower side. However, since the metal rings are suspended in this nitriding treatment jig, the metal rings are unstable in a heating furnace. A filling rate of the metal rings in the heating furnace is low, so that the weight of the jig per the number of metal rings is large, and heating efficiency in heating is deteriorated. The load on the metal ring abutting on the upper side suspending device is concentrated, and deformation or the like of the metal ring occurs in the nitriding treatment.

A nitriding treatment jig for metal rings has been proposed as disclosed in, for example, Japanese Patent No. 4219186. In this nitriding treatment jig, a frame body, in which metal rings are insertably provided in a radial direction, is provided, the metal rings are pressed from a peripheral side by plural members of the frame body so as to be bent in an ellipsoidal shape, and it is held in this condition. However, since the metal rings are also held so as to have an ellipsoidal shape in a vertical direction in this nitriding treatment jig, deformation or the like of the metal ring occur in the nitriding treatment. The above deformation or the like may be corrected by correction of circumference length in a circumference length correction process. However, when the deformation or the like of the metal ring is large, the time period for performing correction of deformation or the like together with the correction of circumference length may be very long.

In order to solve the above problem, a transfer rack for metal rings has been proposed as disclosed in, for example, Japanese Patent No. 2008-240085. In this transfer rack for metal rings, three or more rods parallel to each other stand in a vertical direction, many ring seats, which have a double conical shape projecting in a horizontal direction, are provided to the rods, and the metal rings are inserted between the rods, so that each metal ring is held from a peripheral surface side thereof by a V-shaped recess formed by inclined surfaces of the ring seats next to each other.

However, since mounting of the metal rings to this transfer rack and removing of the metal rings therefrom are manually performed, it is time consuming to mount and remove of the metal rings in large numbers, and the number that can be produced is limited. Even if mounting and removing of the metal rings are automatically performed in the above conventional technique, in a case in which the metal rings are processed one by one, substantial time is consumed for completing the processing of all the metal rings. Due to this, the number produced will be limited or more equipment must be provided.

DISCLOSURE OF THE INVENTION

The present invention is made in consideration of the above problems, and an object of the present invention is to provide an automatic heat treatment method for metal rings which enables performing heat treatment on metal rings automatically and in large numbers.

According to one aspect of the present invention, an automatic heat treatment method for metal rings includes: a metal ring pushing process in which plural shelf members, which have an opening, are provided parallel to each other in a vertical direction and spaced a predetermined interval from each other, are used, the opening having an inner periphery of which total sides are longer than a periphery of each elastic metal ring, and the elastic metal rings are pushed between the plural shelf members; a metal ring extracting process in which each of all the metal rings is deformed into an approximately polygonal shape, which allows all the metal rings to pass through the opening, from arrangement condition of the metal rings, and all the metal rings are pressed and held from insides thereof and are extracted from the opening; a metal ring mounting process in which a heat treatment jig, which has the same opening as that of the shelf member and enables the metal rings to be mounted parallel to each other in a vertical direction and to be spaced the above predetermined interval from each other, is used, all the metal rings, which are held from the insides thereof in the arrangement condition, are inserted from the opening of the heat treatment jig into the heat treatment jig, all the metal rings are released from being held from the insides thereof, and all the metal rings are mounted in the heat treatment jig; a heat treatment process in which the metal rings and the heat treatment jig are subjected to a heat treatment; and a metal ring extracting process in which the metal rings are extracted from the shelf members, wherein when a pushing direction front end of the metal ring or an extracting direction rear end of the metal ring passes on the opening of shelf member, a pushing direction rear end of the metal ring or an extracting direction front end of the metal ring is prevented from floating.

In this aspect of the present invention, many metal rings can be automatically aligned and can be transferred to the heat treatment jig while this arrangement condition of the many metal rings are maintained. Therefore, the heat treatment can be automatically performed on the metal rings in large numbers. In comparison between a polygonal shape and a circular shape, when circumference lengths of the polygonal shape and the circular shape are equal to each other, the area of the circular shape may be larger than that of the polygonal shape. By using this area relationship, an opening, which has a shape corresponding to a shape of the metal ring deformed and clamped by an alignment ring transfer robot hand, may be provided to the shelf members of an alignment stocker, and mounting and extracting from an upper side can be realized.

According to another aspect of the present invention, a pushing method for metal rings includes: pushing metal rings between shelf members which have an opening, are provided parallel to each other in a vertical direction, and are spaced a predetermined interval from each other, the opening having an inner periphery of which total sides are longer than a periphery of each elastic metal rings, wherein when a pushing direction front end of the metal ring passes on the opening of shelf member, a pushing direction rear end of the metal ring is prevented from floating.

According to another aspect of the present invention, a pushing apparatus for metal rings includes: an alignment stocker, a ring receiving and passing pedestal, and a ring alignment mechanism, wherein the alignment stocker has plural shelf members supported parallel to each other in a vertical direction and spaced a predetermined interval from each other, wherein the shelf members have an opening and a moving device, the opening having an inner periphery of which total sides are longer than a periphery of a metal ring, the moving device moving the shelf member in an upper direction and a lower direction so that the shelf member is on the same level as that of the ring receiving and passing pedestal, and wherein the ring alignment mechanism has a work pusher and a work anti-fall member, the work pusher pressing the metal ring for pushing the metal ring, the work anti-fall member abutting on an upper surface of an end portion of the metal ring pushed by the work pusher.

In this aspect of the present invention, many metal rings can be automatically pushed to the alignment stocker. Therefore, the heat treatment can be automatically performed on the metal rings in large numbers. In comparison between a polygonal shape and a circular shape, when circumference lengths of the polygonal shape and the circular shape are equal to each other, the area of the circular shape may be larger than that of the polygonal shape. By using this area relationship, an opening, which has a shape corresponding to a shape of the metal ring deformed and clamped by an alignment ring transfer robot hand, may be provided to the shelf members of the alignment stocker, and mounting and extracting from an upper side can be realized.

According to another aspect of the present invention, an extracting method for metal rings includes: extracting metal rings from a space between the shelf members which have an opening, are provided parallel to each other in a vertical direction, and spaced a predetermined interval therebetween, the opening having an inner periphery of which total sides are longer than a periphery of a metal ring, wherein when an extracting direction rear end of the metal ring passes on the opening of shelf member, an extracting direction front end of the metal ring is prevented from floating.

According to another aspect of the present invention, an extracting apparatus for metal rings includes: an alignment stocker, a ring receiving and passing pedestal, and a ring extracting mechanism, wherein the alignment stocker has plural shelf members which are supported parallel to each other in a vertical direction and spaced a predetermined interval therebetween, wherein the shelf members have an opening and a moving device, the opening having an inner periphery of which total sides are longer than a periphery of a metal ring, the moving device moving the shelf member in an upper and a lower direction so that the shelf member is on the same level as that of the ring receiving and passing pedestal, and wherein the ring extracting mechanism has a work catcher and a work anti-fall member, the work catcher catching the metal ring for extracting the metal ring, the work anti-fall member abutting on an upper surface of an end portion of the metal ring extracted by the work catcher.

In this aspect of the present invention, many metal rings can be automatically extracted from the alignment stocker. Therefore, the heat treatment can be automatically performed on the metal rings in large numbers. In comparison between a polygonal shape and a circular shape, when circumference lengths of the polygonal shape and the circular shape are equal to each other, the area of the circular shape may larger than that of the polygonal shape. By using this area relationship, an opening, which has a shape corresponding to a shape of the metal ring deformed and clamped by an alignment ring transfer robot hand, may be provided to the shelf members of the alignment stocker, and mounting and extracting from an upper side can be realized.

According to the automatic heat treatment method for metal rings of the present invention, the heat treatment can be automatically performed on the metal rings in large numbers.

BEST MODE FOR CARRYING OUT THE INVENTION

Figure 1:
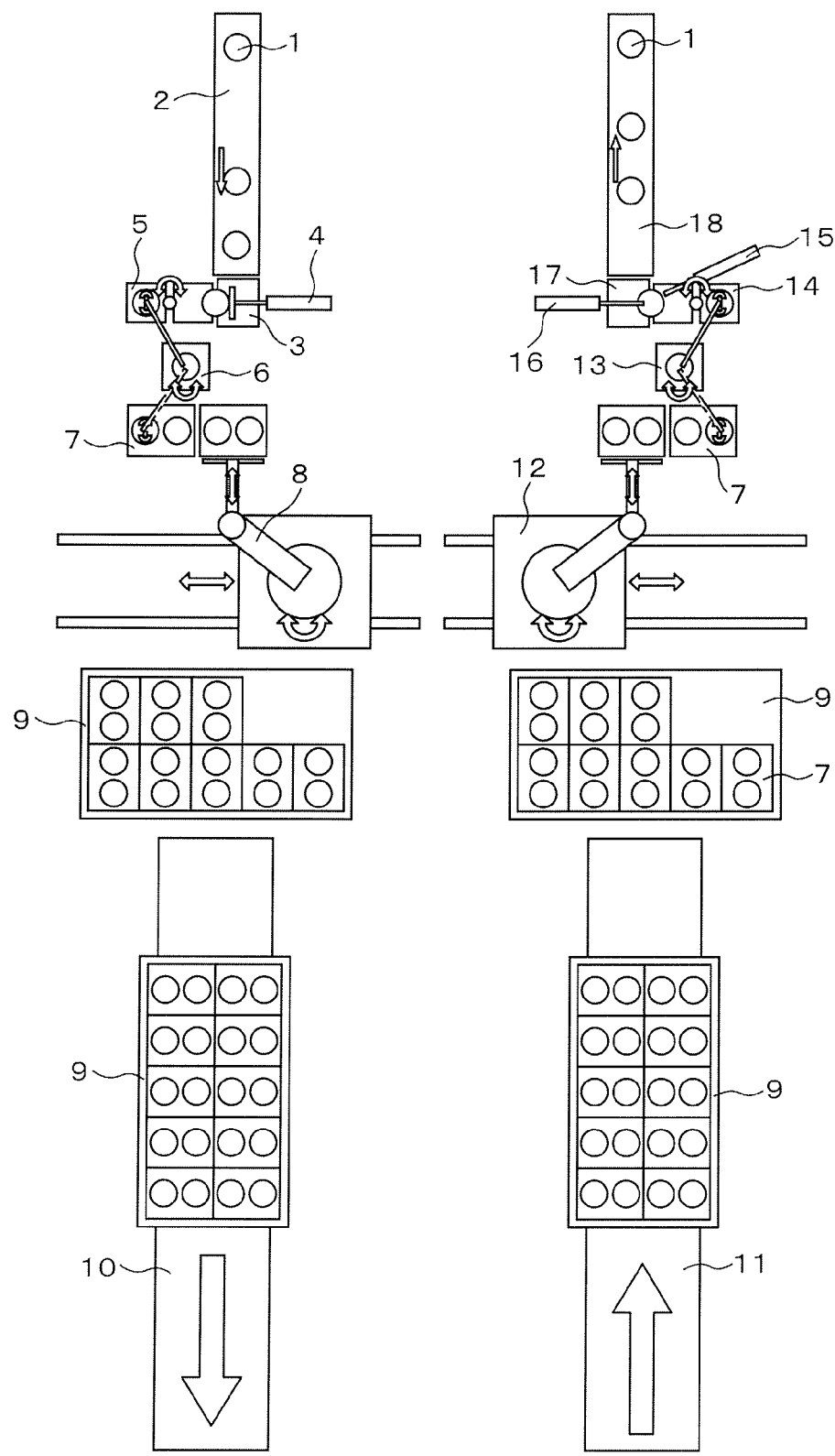
FIG. 1 is a conceptual diagram showing one embodiment of an automatic heat treatment method for metal rings according to the present invention.

An embodiment of an automatic heat treatment method for metal rings according to the present invention will be specifically described with reference to the Figures hereinafter. FIG. 1 is a conceptual diagram showing one embodiment of an automatic heat treatment method for metal rings according to the present invention. In the embodiment of the automatic heat treatment method for metal rings according to the present invention, first, as shown in FIG. 1, metal rings 1 are transferred to a ring receiving and passing pedestal 3 by a metal ring transfer conveyor 2. The metal rings 1 transferred to the ring receiving and passing pedestal 3 are mounted on an alignment stocker 5 by a ring aligning mechanism 4. The metal rings 1 aligned and mounted on the alignment stocker 5 are maintained in this arrangement condition, the metal rings 1 are transferred to heat treatment jigs 7 by an alignment ring transfer robot hand 6, and are fixed thereon.

Next, the heat treatment jigs 7 having the metal rings 1 mounted thereon are stacked on a jig mounting pallet 9 by a jig transfer robot 8. This jig mounting pallet 9 is transferred into a heat treatment furnace by a pallet transfer conveyor 10, and the many metal rings 1 mounted on the jig mounting pallet 9 are subjected to heat treatment in a predetermined manner in the heat treatment furnace.

The above processes are performed on the metal rings 1 in reverse order after the heat treatment, and the metal rings 1 are obtained separately. That is, the jig mounting pallet 9 after the heat treatment is transferred from the heat treatment furnace by a pallet transfer conveyor 11. The heat treatment jigs 7 stacked on the jig mounting pallet 9 are moved downwardly from the jig mounting pallet 9 by a jig transfer robot 12. While the metal rings 1 aligned and mounted on the heat treatment jig 7 are maintained in this arrangement condition, the metal rings 1 are removed from the heat treatment jig 7 and are transferred to an alignment stocker 14 by an alignment ring transfer robot hand 13.

Next, the transferred metal rings 1 are pushed out from the alignment stocker 14 by a pushing cylinder 15, and then the metal rings 1 are extracted from the alignment stocker 14 to a ring receiving and passing pedestal 17 by a ring extracting mechanism 16. The extracted metal rings 1 are transferred by a metal ring transfer conveyor 18. In this manner, the metal rings 1 are automatically fixed to the jig and are subjected to the heat treatment. These processes will be explained in detail hereinafter.

1. Aligning Process for Metal Rings

In this process, metal rings 1, which are transferred to the ring receiving and passing pedestal 3 by the metal ring transfer conveyor 2, are mounted on the alignment stocker 5. The metal rings 1 of the embodiment according to the present invention are formed as follows. Opposite ends of a thin plate made of a steel material of maraging steel, stainless steel, or the like are welded, so that the thin plate is formed into a cylindrical shape. The cylindrical steel material is subjected to solution treatment for homogenizing a portion of the steel material which is hardened by welding heat. Next, the cylindrical steel material is cut by a predetermined width so that endless belt-like metal rings are formed, and each metal ring is subjected to rolling so as to have a predetermined thickness. Next, the metal rings are subjected to solution treatment again, so that metal structures thereof are recrystallized. After that, if necessary, each metal ring is subjected to circumference length correction. In this manner, the metal rings 1 are formed. Each metal ring 1 has an approximately circular ring shape when external force is not applied thereto. Each metal ring is subjected to aging treatment and nitriding treatment, hardness and wear resistance thereof are improved.

Figure 2:
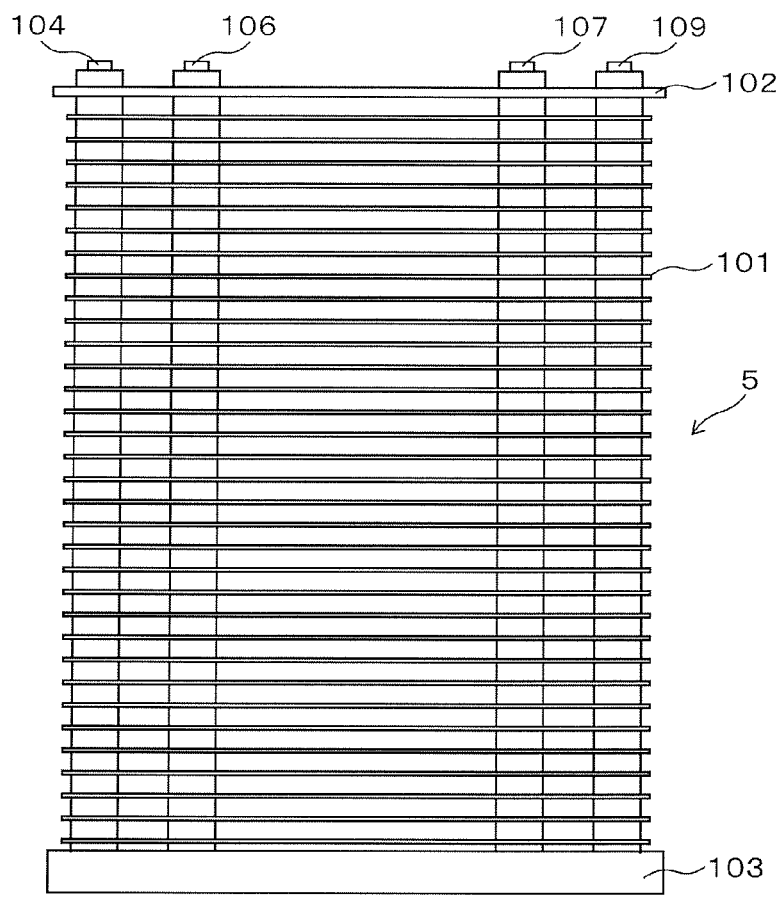
FIG. 2 is a front view showing one embodiment of an alignment stocker according to the present invention.
Figure 3:
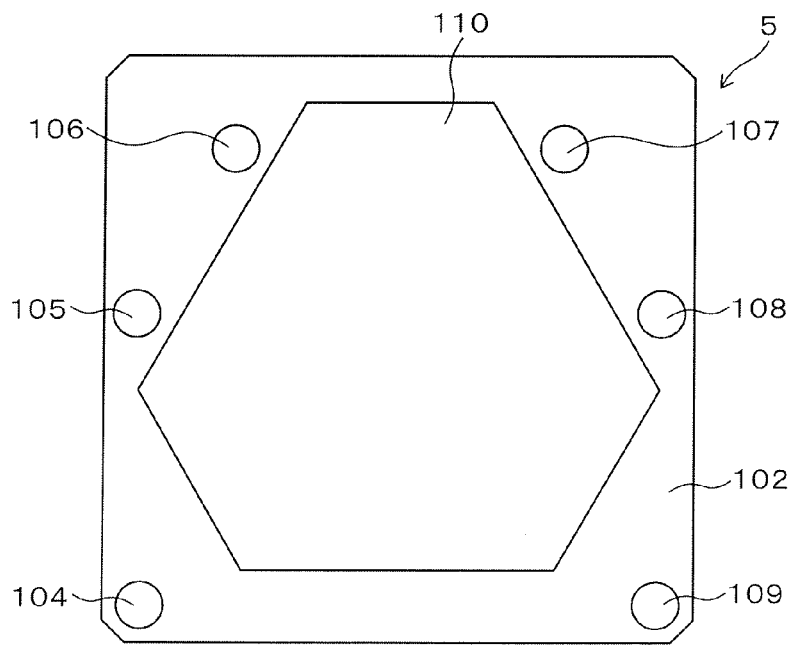
FIG. 3 is a top view showing one embodiment of an alignment stocker according to the present invention.

The alignment stocker 5 of the embodiment according to the present invention is formed such that two same structures, which can align many metal rings in a vertical direction and can mount them, are rotatably disposed parallel to each other. As shown in FIGS. 2 and 3, in the one structure, plural shelf members 101 are supported between an upper portion plate member 102 and a lower portion plate member 103 by plural support members 104 to 109. In this case, the shelf members 101 are spaced a predetermined interval from each other and are parallel to the upper portion plate member 102 and the lower portion plate member 103. The interval between the plural shelf members 101 is approximately equal to an interval between plural metal rings mounted on the following heat treatment jig. The alignment stocker 5 is structured so as to move this interval vertically, and the alignment stocker 5 can control all the shelf members 101 such that all the shelf members 101 are as high as the ring receiving and passing pedestal 3. Thus, the metal rings 1 can be mounted between all the shelf members 101. FIG. 2 is a front view showing one embodiment of an alignment stocker according to the present invention, and FIG. 3 is a top view thereof.

The interval between support members 104 and 109 is larger than the diameter of the metal ring, and the support members 105 to 109 are structured so as to abut on the peripheral portion of the metal ring when the metal ring is mounted. Thus, when the metal ring is pushed from the front side shown in FIG. 2 or the lower side shown in FIG. 3, the metal ring passes between the support members 104 and 109, the metal ring is inserted until the peripheral portion of the metal ring abuts on the support members 105 to 109.

An opening 110 having a hexagonal shape is provided to the upper portion plate member 102 and the shelf members

Figure 4:
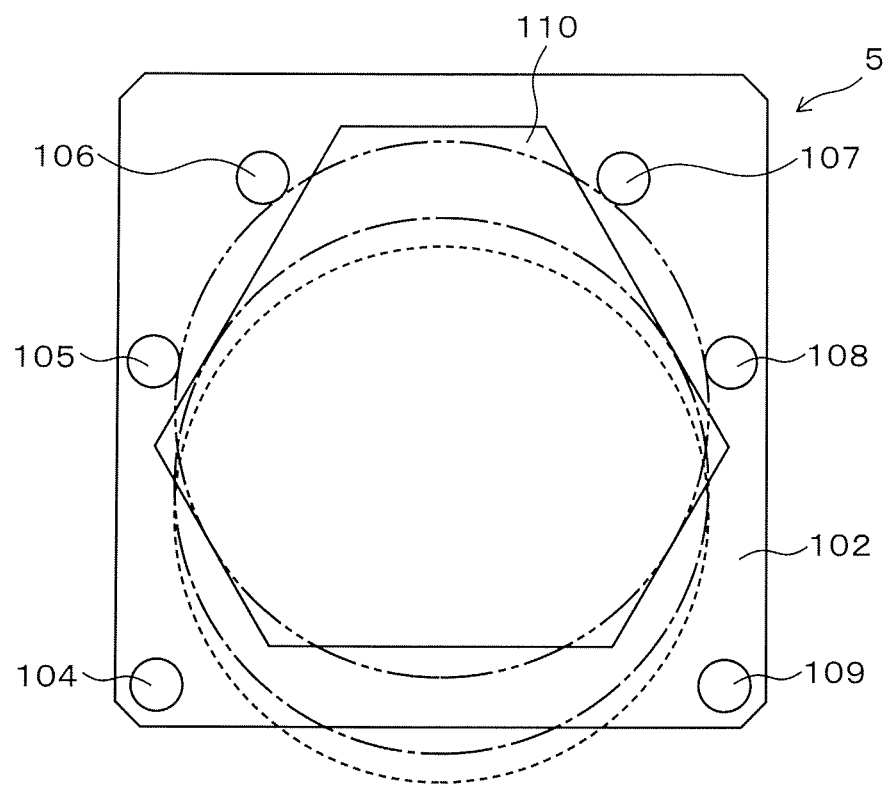
FIG. 4 is a conceptual diagram showing arrangement of an opening of an alignment stocker and a metal ring according to the present invention.

101. Each of the openings 110 has an inner periphery of which total sides are longer than a periphery of the metal ring. The openings 110 are used when the metal ring is transferred to the heat treatment jig described below. The openings 110 have no problem in a condition that the metal ring is fully inserted. However, the following problem may occur. That is, as shown in FIG. 4, when the metal ring is pushed from the lower side shown in the FIG. 4 and the metal ring is inserted to a dotted line position, chain line position, and chain line two-dot chain line position, at a region from the dotted line position to the chain line position, the end portion of the metal ring may be inclined toward the opening 110 and may enter the opening 110.

Figure 5:
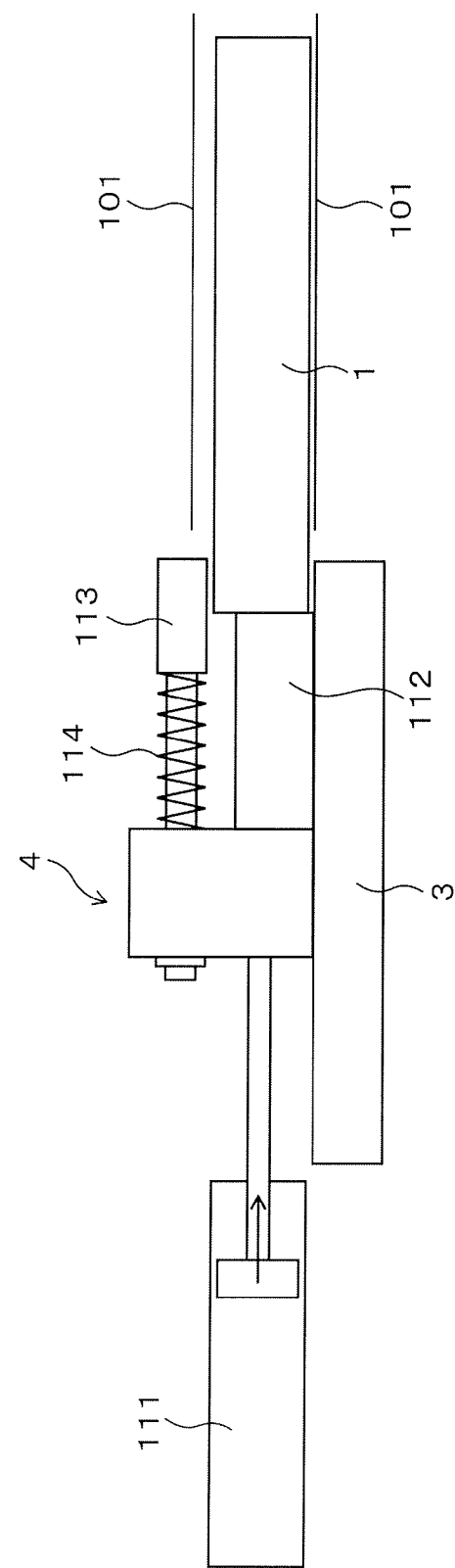
FIG. 5 is a cross sectional view showing a process for pushing a metal ring to an alignment stocker.
Figure 6:
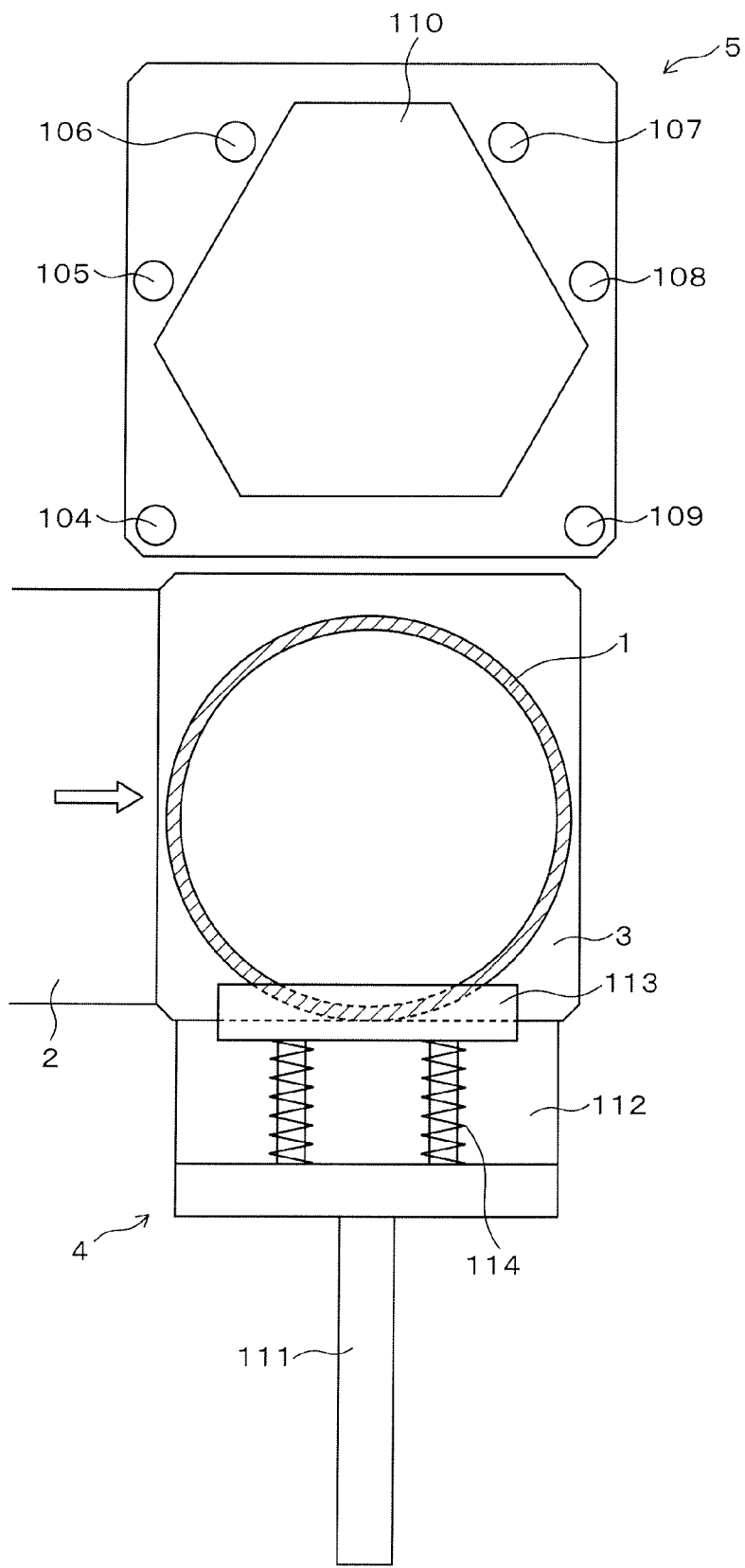
FIG. 6 is a top view showing a process for pushing a metal ring to an alignment stocker according to the present invention.

In the ring alignment mechanism 4 of the embodiment according to the present invention, as shown in FIG. 5, in addition to a cylinder 111 and a work pusher 112 for pushing the metal ring 1 from the ring receiving and passing pedestal 3 to the shelf member 101 of the alignment stocker 5, a work anti-fall member 113 is provided in order to solve the above problem. As shown in FIGS. 5 and 6, the work anti-fall member 113 is structured so as to be pushed toward the alignment stocker 5 together with the work pusher 112 by the cylinder 111. The work anti-fall member 113 is disposed so as to cover an upper surface of the end portion of the metal ring 1 which is contacted by the work pusher 112.

When the metal ring 1 is pushed toward the alignment stocker 5 by the ring alignment mechanism 4, the end portion of the metal ring 1 which is opposite to the end portion thereof proximate to the opening 110 (that is, the end portion of the metal ring 1 which abuts on the work pusher 112) may start floating when the end portion thereof proximate to the opening 110 may enter the opening 110. However, since the work anti-fall member 113 is provided on the upper surface of the end portion of the metal ring 1 which may start floating, this floating of the metal ring 1 is inhibited, and the metal ring 1 is pushed between the shelf members 101 while the metal ring 1 is maintained in a condition parallel to the shelf members 101.

Figure 7:
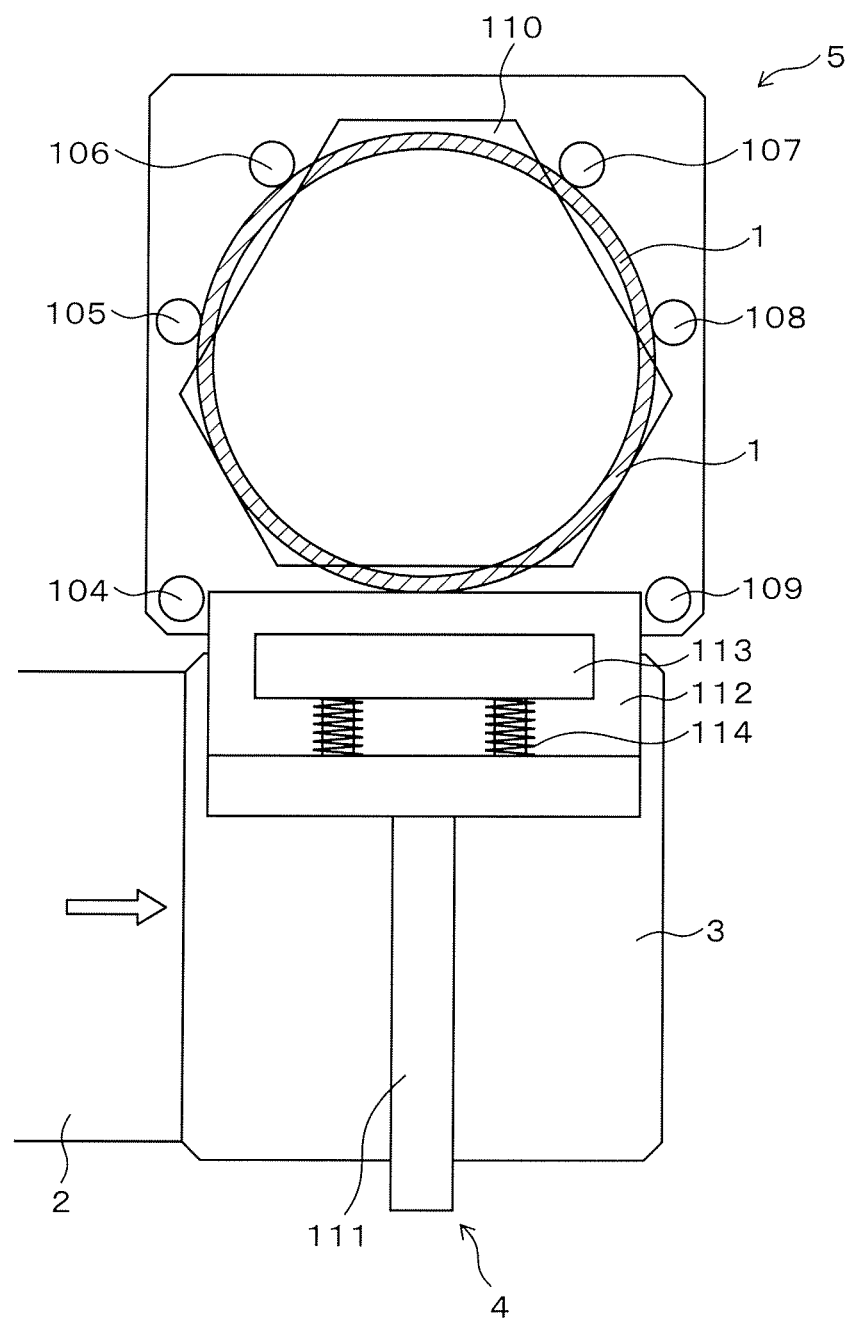
FIG. 7 is a top view showing a process for pushing a metal ring to an alignment stocker according to the present invention.

After that, when the metal ring 1 passes on the region which the end portion thereof may enter, as shown in FIGS. 5 and 7, the work anti-fall member 113 abuts on the shelf member 101. However, since the work anti-fall member 113 is provided to the cylinder 111 via a spring 114, after abutting on the shelf member 101, the movement of the work anti-fall member 113 is stopped, and the metal ring is inserted until the peripheral portion of the metal ring abuts on the support members 105 to 109.

The alignment stocker 5 has a moving device. The moving device moves an interval between the proximate shelf members 101 in an upper direction or a lower direction, so that the shelf member 101, to which the shelf member 101 is not pushed, is moved, and the shelf member 101 has the same surface as the ring receiving and passing pedestal 3. The moving device pushes next metal ring 1 between the empty shelf members 101, and this action is repeated, so that many metal rings 1 are mounted on the alignment stocker 5 and they are aligned in a vertical direction. Next, the alignment stocker 5, which has the metal rings mounted and aligned between the shelf members 101 as described above, is rotated, and in the same manner as that of this structure, many metal rings 1 are also mounted and aligned in the other structure which has the same as this structure and is parallel thereto.

2. Transfer Process to Heat Treatment Jig

Figure 8:
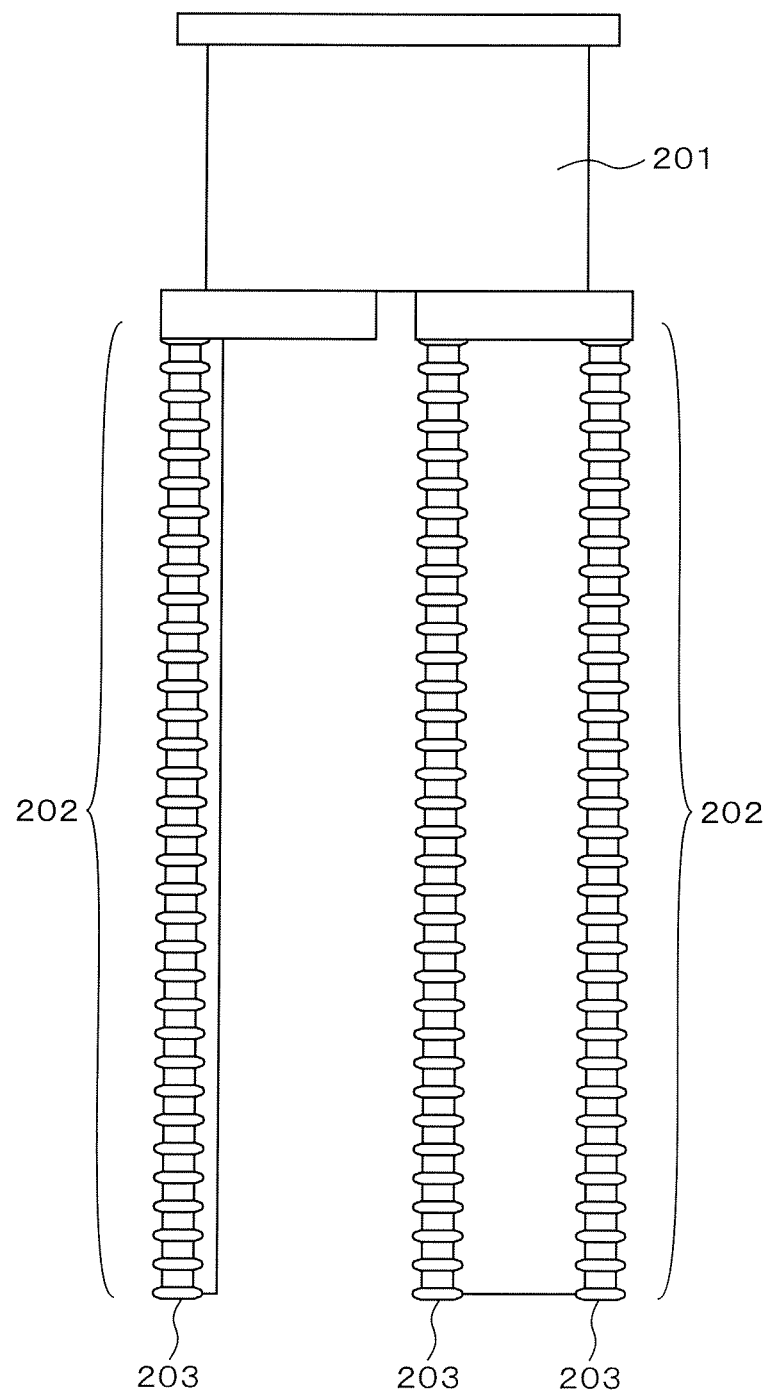
FIG. 8 is a front view showing one embodiment of an alignment ring transfer robot hand of an embodiment according to the present invention.
Figure 9:
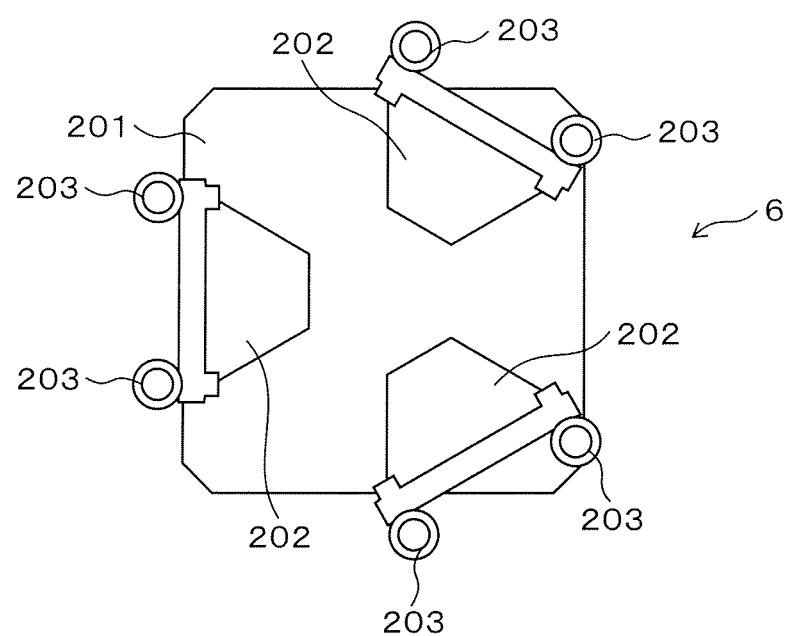
FIG. 9 is a bottom view showing one embodiment of an alignment ring transfer robot hand according to the present invention.

In this process, while the metal rings 1 aligned and mounted in the alignment stocker 5 are maintained in this arrangement condition, the metal rings 1 are transferred to the heat treatment jigs 7 by the alignment ring transfer robot hand 6, and the metal rings 1 are fixed therein. As shown in FIGS. 8 and 9, the alignment ring transfer robot hand 6 of the embodiment according to the present invention has a base portion 201 and finger members 202. The base section 201 has a driving mechanism. The finger members 202 are respectively expanded in three directions by the driving mechanism of the base portion 201. Projections 203 are provided at two positions of the finger members 202. FIG. 8 is a front view showing one embodiment of an alignment ring transfer robot hand according to the present invention, and FIG. 9 is a bottom view thereof.

Figure 10:
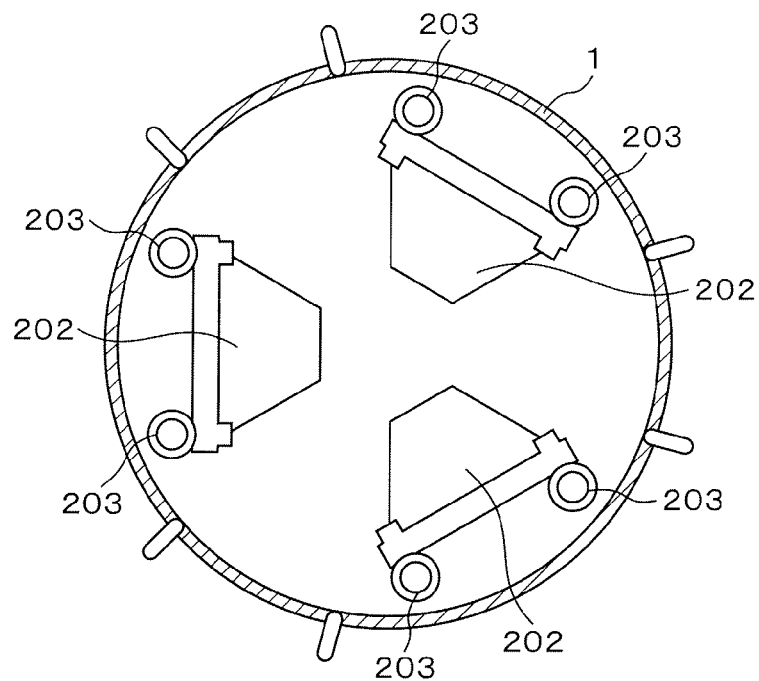
FIG. 10 is a bottom view showing a condition in which an alignment ring transfer robot hand according to the present invention is inserted in a metal ring.
Figure 11:
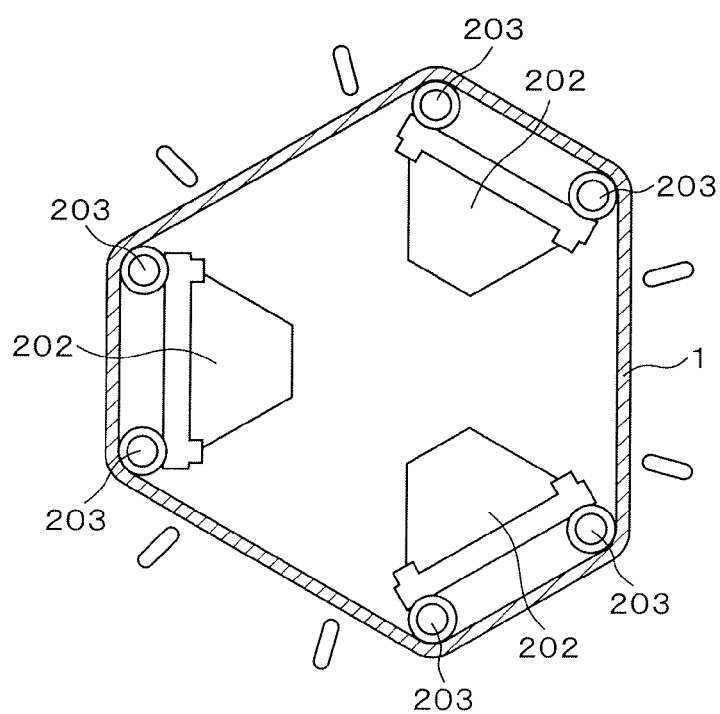
FIG. 11 is a bottom view showing a condition in which an alignment ring transfer robot hand according to the present invention is expanded in a metal ring.

In the alignment ring transfer robot hand 6 having the above structure of the embodiment according to the present invention, as shown in FIG. 10, the finger members 202 can be inserted vertically from the upper side into radial direction centers of many metal rings 1, which are approximately circular and are aligned in a vertical direction in the alignment stocker 5, via the hexagonal openings 110 of the upper portion plate member 102 and the shelf members 101. Next, the finger member 202, which are inserted in the centers of the metal rings 1, are respectively expanded in three directions, so that as shown in FIG. 11, the projections 203 expands inner peripheral surfaces of the many metal rings 1 toward an outer direction, and all the metal rings 1 are deformed so as to have hexagonal shapes and are clamped.

As described above, since each of the openings 110 has an inner periphery of which total sides are longer than a periphery of the metal ring 1 which is deformed so as to have hexagonal shape and is clamped, the finger members 202 clamping the many metal rings 1 are extracted upwardly, so that all the aligned metal rings 1 can be simultaneously ejected while the aligned conditions thereof are maintained.

A cushion mechanism is desirably provided at a portion abutting on the metal ring 1 on the projections 203 which are formed at two positions of one of the three finger members 202. Thus, even when metal rings 1 have different circumference lengths, the difference between circumference lengths can be absorbed.

Figure 12:
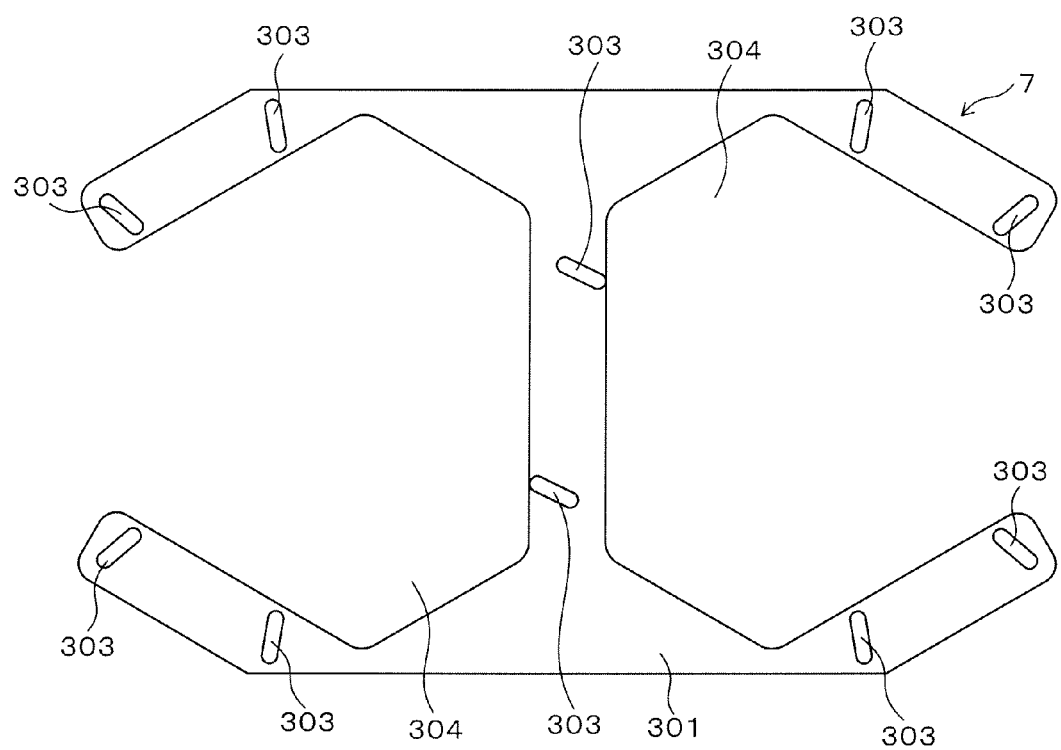
FIG. 12 is a top view showing one embodiment of a heat treatment jig for metal rings according to the present invention.
Figure 13:
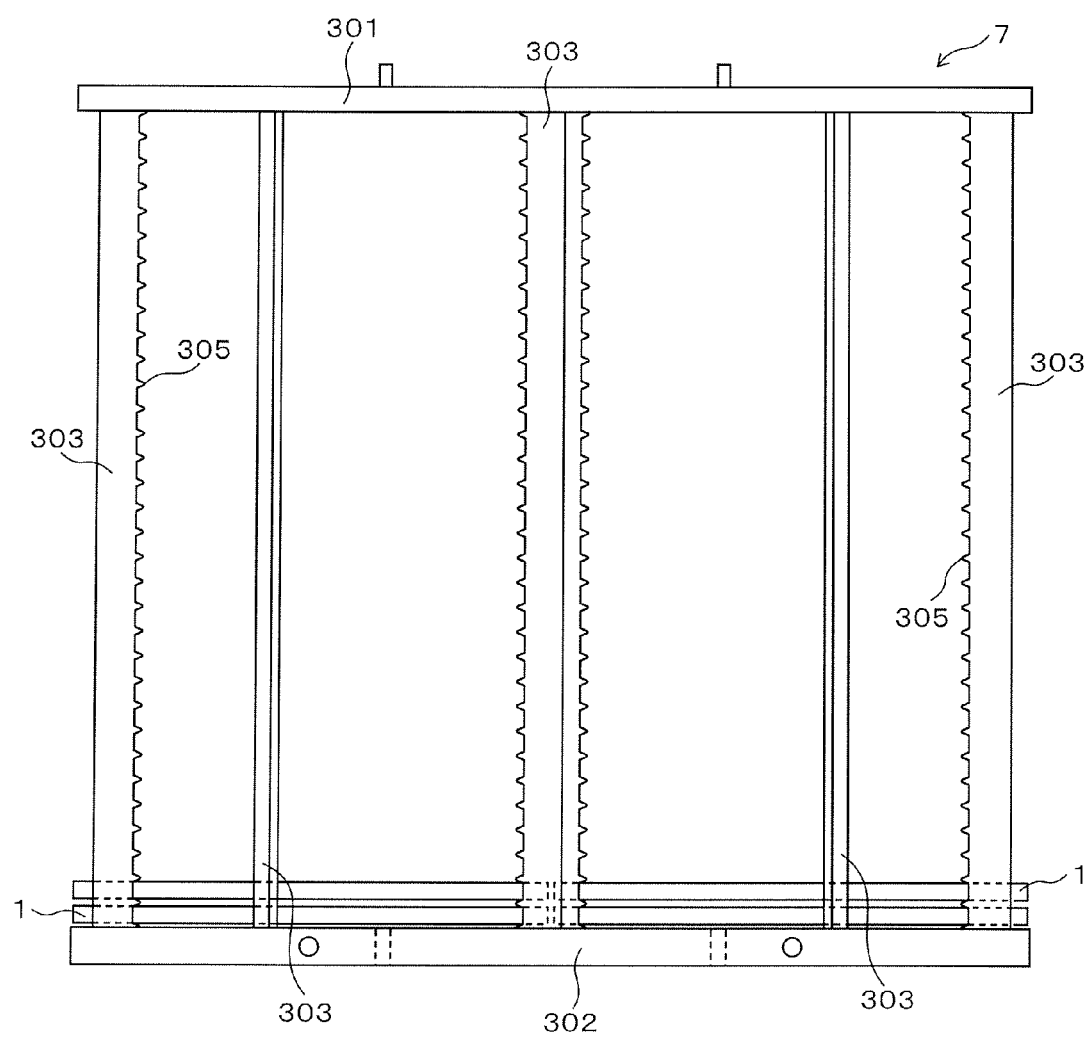
FIG. 13 is a front view showing one embodiment of a heat treatment jig for metal rings according to the present invention.

As shown in FIGS. 12 and 13, in the heat treatment jig 7 of the embodiment according to the present invention, three or more parallel metal ring holding members 303 are provided so as to stand in a vertical direction between a cap 301 and a bottom portion 302 and abut on the periphery of the metal ring 1. Openings 304 are provided to the cap 301, and each opening 304 has a periphery of which total sides are longer than the periphery of the metal ring 1 deformed and clamped as described above. Projections 305 are provided on only the surfaces, which face the metal rings 1, of the metal ring holding members 303 so as to be spaced a predetermined interval from each other. Each projection 305 has an inclined surface. When the periphery of the metal ring 1 is inserted between the two projections 305 proximate to each other, the peripheral edge of the metal ring 1 abuts on the inclined surfaces of the projections 305. The metal ring holding members 303 are structured such that the projections are formed so as to have the same height when three or more metal ring holding members 303 are provided so as to stand parallel to each other. In a case in which the metal ring 1 is inserted between the projections proximate to each other, the metal ring 1 is held horizontally therebetween. FIG. 12 is a top view showing one embodiment of the heat treatment jig for metal rings according to the present invention, and FIG. 13 is a front view thereof.

It is desirable that the metal ring holding member 303 be a plate member extending from a surface, which has the projections 305, to a back surface. In this structure, the heat capacity can be greatly reduced, the heat following capacity can be further improved in heat treatment, and the ratio of change in the diameter of the metal ring caused by heat treatment can be reduced in comparison with a conventional heat treatment jig (which has a columnar portion, a projection, and a tapered portion, the projection being concentric to the columnar portion, projecting from the columnar portion, and holding the projection at an upper side and a lower side thereof, the tapered portion being concentric to the columnar portion and formed to have a diameter which is larger from the columnar portion to the projection). In a weight reduction experiment example, about 20% weight reduction can be realized.

It is desirable that the metal ring holding member 303 be a hollow member. Since the metal ring holding member 303 is hollow, weight reduction can be further realized. During heating in the heat treatment, the heat following capacity in the heat treatment can be further improved by introducing a heated atmosphere into a hollow portion of the metal ring holding member 303. In a weight reduction experiment example, about 40% weight reduction can be realized, and about 14% weight reduction per one jig can be realized.

It is desirable that two or more pairs of the metal ring holding members 303 per one jig, which arrange many metal rings parallel and horizontally, are provided in the heat treatment jig 7. In this structure, the jig weight per one metal ring can be reduced, and the heat efficiency can be improved in heat treatment. In an experiment example, in comparison with a heat treatment jig having a pair of metal ring holding members per one jig, the jig weight per one metal ring could be reduced by about 9%, and the jig volume per one metal ring could be reduced by about 10%.

When two or more pairs of the metal ring holding members 303 are provided per one jig as described above, each metal ring holding member 303, which has projections facing the metal ring 1 on both surfaces thereof, can be provided at a position to which the metal ring 1 mounted on the metal ring holding member 303 is the most proximate. The metal rings 1 of the pairs of the metal ring holding members 303 can be simultaneously held. In this structure, the number of metal ring holding members 303 used in the heat treatment jig 7 can be reduced, and the weight of the heat treatment jig 7 can be reduced.

Figure 14:
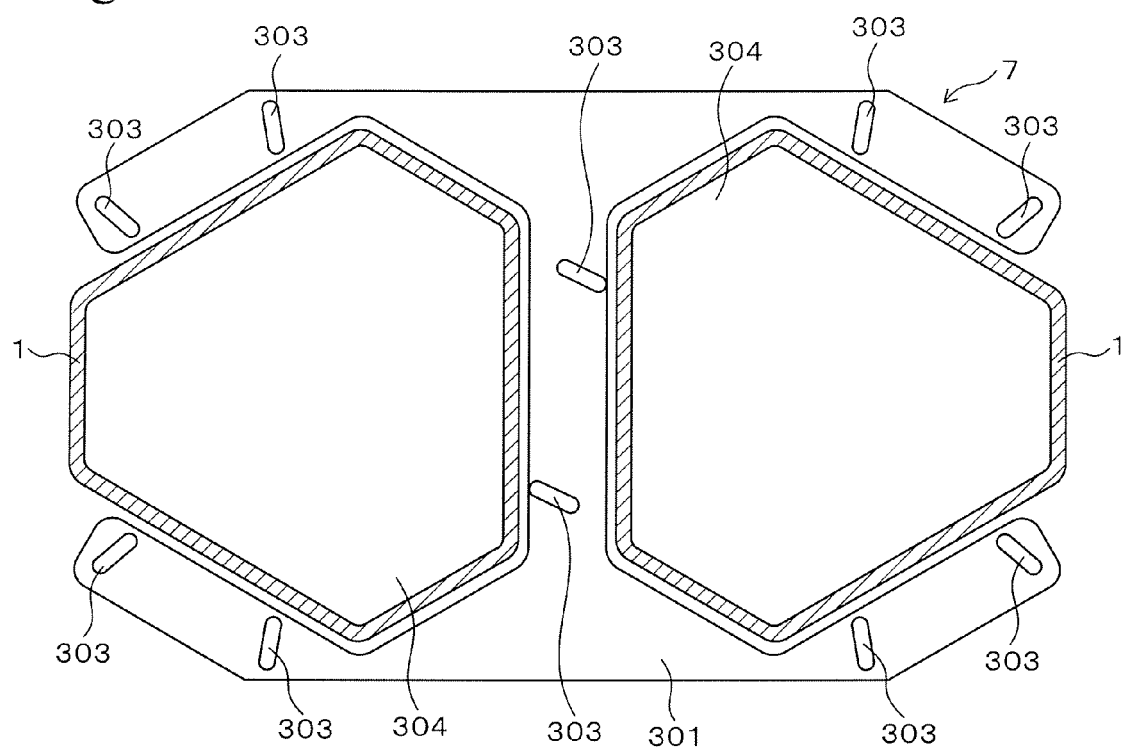
FIG. 14 is a top view showing a condition in which a metal ring, which is deformed and clamped, is inserted into a heat treatment jig for metal rings according to the present invention.
Figure 15:
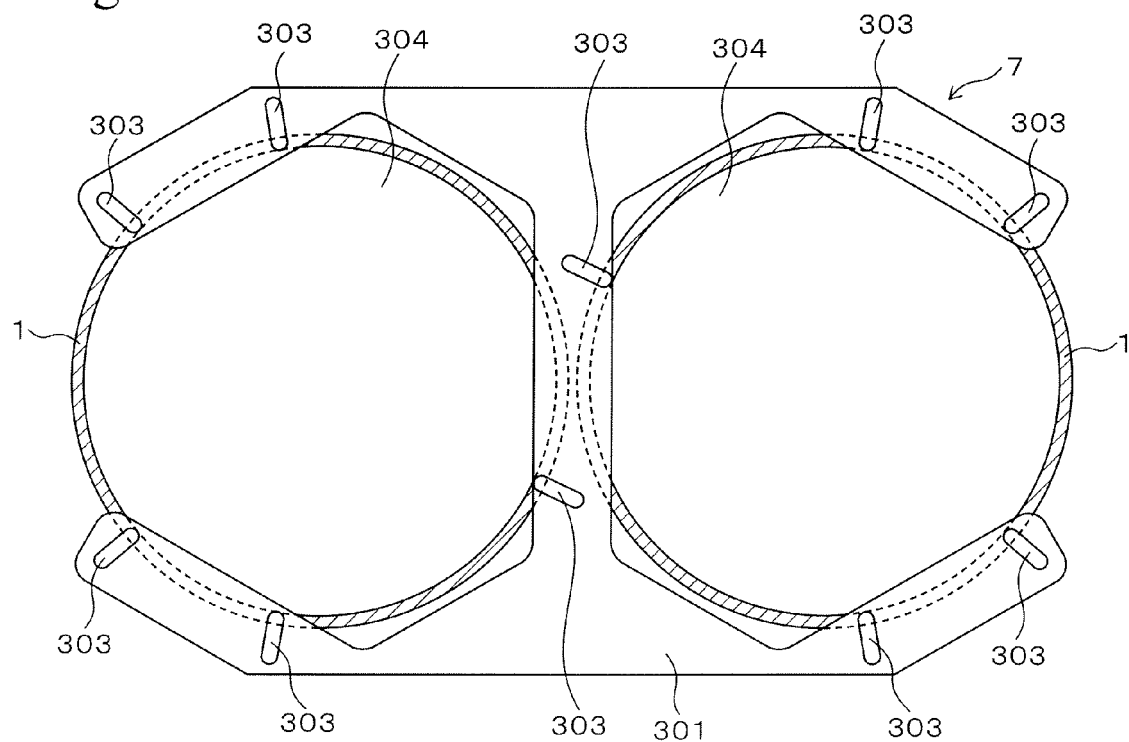
FIG. 15 is a top view showing a condition in which a metal ring, which is deformed and clamped and is inserted into a heat treatment jig for metal rings according to the present invention, is restored to an approximately circular shape.

In the heat treatment jig 7 of the embodiment according to the present invention, as shown in FIG. 14, the finger members clamping the many metal rings 1 as described above are inserted from the upper side to the opening 304, and the positions of the finger members are adjusted so that each periphery of the metal ring 1 and a recess of each metal ring holding member 303, on which the metal ring 1 is mounted, have the same height. Next, the sizes of the finger members are reduced, and the shape of the metal ring 1, which is clamped and deformed so as to be hexagonal, is restored to an approximately circular shape by elastic force. As shown in FIG. 15, the peripheral edge of each metal ring 1 is held by the recess of the metal ring holding member 303, and all the metal rings 1 are simultaneously held in large numbers horizontally.

3. Heat Treatment Process for Metal Ring

In this process, the heat treatment jigs 7, which have metal rings 1 mounted thereon in large numbers, are stacked on the jig mounting pallet 9 by the jig transfer robot 8. This jig mounting pallet 9 is transferred into the heat treatment furnace by the pallet transfer conveyor 10, and the many metal rings 1 mounted on the jig mounting pallet 9 are subjected to predetermined heat treatment in the heat treatment furnace. In this embodiment of the present invention, it is desirable that the number of the heat treatment jigs 7 stacked on the jig mounting pallet 9 is 20 (5 columns×2 lines×2 stages). In this structure, the filling ratio of the metal rings in the heat treatment furnace is high, and the heat treatment can be performed efficiently at low cost.

Next, the heat treatment using the heat treatment jigs 7 will be specifically explained. For the sake of simplifying the explanation, a case in which one heat treatment jig 7 is subjected to heating will be explained hereinafter.

The heat treatment jig 7 having the metal rings 1 mounted thereon is transferred into a heat treatment furnace 306 (shown in FIG. 16) by a transfer device (not shown in the Figure). The metal ring holding member 303 of this embodiment is a hollow member having opening at both end portions thereof. In the heat treatment jig 7 in the heat treatment furnace 306, the inside portion of the metal ring holding member 303, which is the hollow member, is communicated with that of the heat treatment furnace 306 via respective openings. The heat treatment furnace 306 is formed so as to have a long length along a transfer direction of the heat treatment jig 7, and heaters 309 and 310 are provided at the inwards of side walls 307 and 308, and a circulating fan 313 having a stirring wing 312 at a ceiling wall 311 is provided.

An example using nitriding treatment as the heat treatment will be explained as follows. In the heat treatment furnace 306 shown in FIG. 16, for example, a nitriding gas (ammonia gas or the like) is supplied. This nitriding gas is heated to a predetermined temperature (for example, about 500 degrees C.), which enables nitriding of the metal ring 1, by the heaters 309 and 310. The heated nitriding gas moves upwardly to the ceiling wall 311 of the heat treatment furnace 306. The nitriding gas moving upwardly convects in the heat treatment furnace 306 by rotating the stirring wing 312 of the circulating fan 313.

Figure 16:
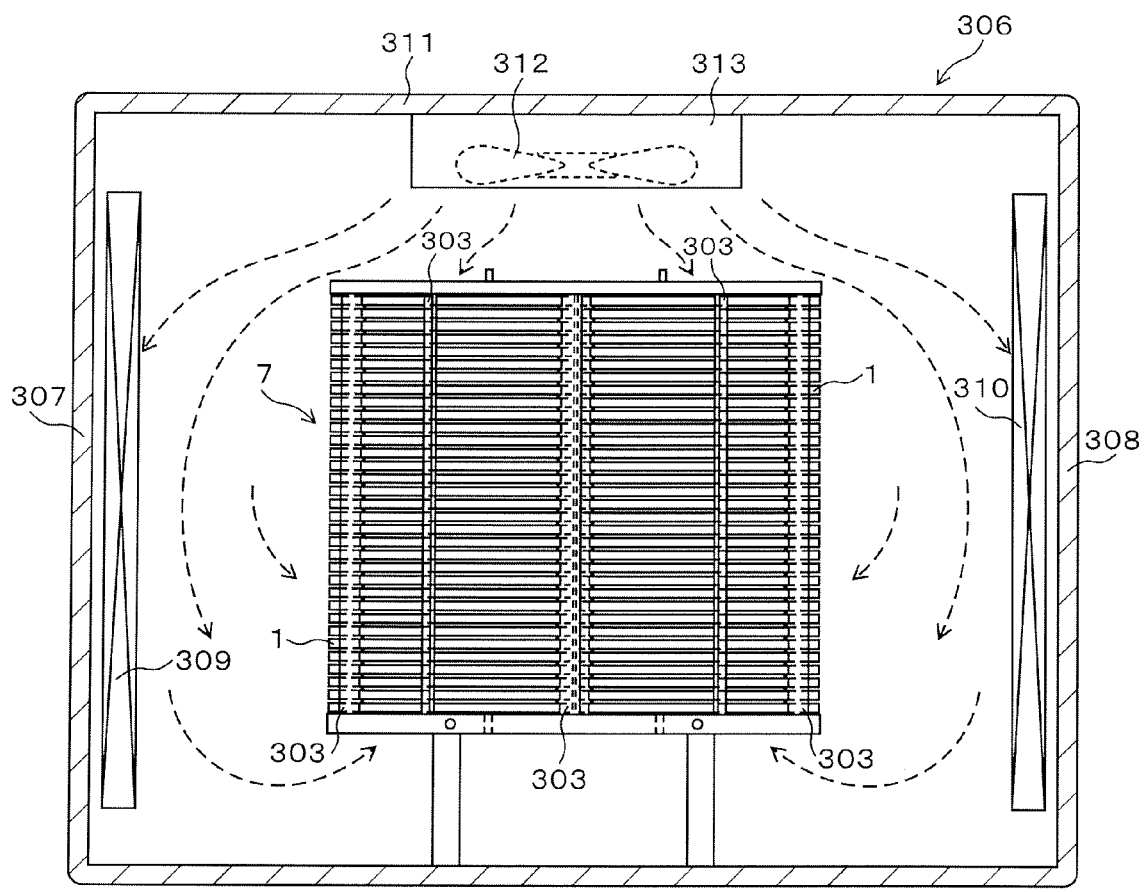
FIG. 16 is a conceptual diagram showing one embodiment of heat treatment according to the present invention.

As a result, the nitriding gas moves downwardly along the side walls 307 and 308, and the nitriding gas will move upwardly in the neighborhood of floor of the heat treatment furnace 306 and in the neighborhood of the heat treatment jig 7 again. In this case, as described above, the inside portion of the metal ring holding member 303 is communicated with that of the heat treatment furnace 306 via the openings of both end portions. Therefore, as shown in FIG. 16, the nitriding gas is introduced from the lower side opening of the metal ring holding member 303. That is, in this case, the lower side opening of the metal ring holding member 303 is directed to the upper stream side of circulation direction of the nitriding gas, and the lower side opening thereof functions as an introducing opening of the nitriding gas. After the nitriding gas passes through the inside portion of the metal ring holding member 303, the nitriding gas is discharged from the upper side opening of the metal ring holding member 303, and the nitriding gas is directed to the ceiling wall 311 of the heat treatment furnace 306.

In this manner, in this embodiment in which the hollow plate member of which the inside portion is communicated with the air is used as the metal ring holding member 303, in the nitriding treatment of the metal rings 1, the heated nitriding gas is circulated in the metal ring holding member 303, and the nitriding gas, which is heated to about the same degree as that of the inside portion of the metal ring holding member 303, also exists at the outside portion thereof. That is, the nitriding gas heated to about the same degree exists at both the inside portion and the outside portion of the metal ring holding member 303. Thus, the temperature is balanced at the inside portion and the outside portion of the metal ring holding member 303, so that the temperature of the whole metal ring 1 is approximately uniform. That is, the temperature at the contact point of the metal ring holding member 303 and the metal ring 1 is approximately equal to that at another portion of the metal ring 1. The nitriding gas enters from the surface of the metal ring 1 and diffuses in the inner portion of the metal ring 1, so that nitrided layer is formed on the surface of the metal ring 1. That is, so-called nitriding progresses. The metal ring 1 is hardened by this nitrided layer.

As described above, the temperature is approximately uniform in the whole of the metal ring 1. Thus, the nitriding progresses approximately uniformly in the whole metal ring 1. That is, in the heat treatment of the embodiment according to the present invention, the heat following capacity in the heat treatment is improved, and uneven progress in the nitriding is prevented. variation in thickness of the nitrided layer is prevented, variation in hardening degree of the nitrided layer is prevented, and the change in diameter of the metal ring due to the heat treatment is reduced.

4. Extracting Process of Metal Ring

In this process, after completing the heat treatment, the jig mounting pallet 9 subjected to the heat treatment is transferred from the heat treatment furnace by the pallet transfer conveyor 11. The heat treatment jigs 7 stacked on the jig mounting pallet 9 are moved downwardly from the jig mounting pallet 9 by the jig transfer robot 12. While the metal rings 1 aligned and mounted 9 in the heat treatment jig 7 are maintained in this arrangement condition, the metal rings 1 are removed from the heat treatment jig 7 by the alignment ring transfer robot hand 13, and the metal rings 1 are transferred to the alignment stocker 14. Since these actions are performed on the metal rings 1 by performing the respective processes (the transfer process from the alignment stocker to the heat treatment jig and the heat treatment process) in reverse order, the detail explanation will be omitted.

Next, the metal rings 1 transferred to the alignment stocker 14 are pushed out from the alignment stocker 14 by the pushing cylinder 15, and then the metal rings 1 are extracted from the alignment stocker 14 onto the ring receiving and passing pedestal 17 by the ring extracting mechanism 16. The extracted metal rings 1 are transferred to the next process by the metal ring transfer conveyor 18.

The extracting process for extracting the metal rings from the alignment stocker of the embodiment according to the present invention will be explained in detail hereinafter. First, as shown in FIG. 1, the metal ring 1 transferred to the alignment stocker 14 is pushed from the alignment stocker 14 by the pushing cylinder 15. Thus, the end portion of the metal ring 1 can be pushed from the space between the shelf members 401 proximate to each other in the alignment stocker 14, and extracting of the metal ring 1 in the next process can be performed.

Figure 17A:
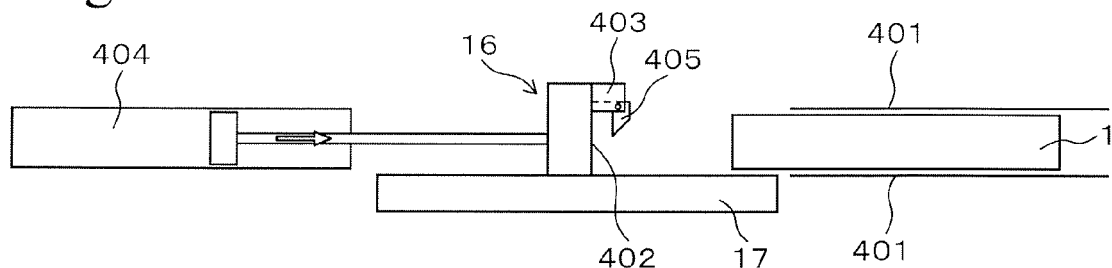
FIGS. 17A to 17E are cross sectional views showing a process for extracting a metal ring from an alignment stocker.

Next, the inner peripheral surface of the metal ring 1, which is pushed from the space between the shelf members 401 proximate to each other, is caught by a work catcher 405. As shown in FIG. 17A, the ring extracting mechanism 16 has a front end surface 402 and a work anti-fall member 403. The front end surface 402 abuts on the end portion of the metal ring 1. The work anti-fall member 403 is disposed so as to cover the upper surface of the end portion of the abutted metal ring 1. The ring extracting mechanism 16 can slide on the ring receiving and passing pedestal 17 toward the metal ring 1, which is pushed in the alignment stocker 14, by a cylinder 404. The work catcher 405 which is claw-like is provided at the front end portion of the work anti-fall member 403. The work catcher 405 is pressed up only in a extracting direction of the metal ring 1, the work catcher 405 passes through the upper side of end portion of the metal ring 1 in the pressed up condition of the work catcher 405, and the work catcher 405 falls into the inside of the metal ring 1 after the end portion of the metal ring 1 passes through. The work anti-fall member 403 has a lower surface of which length is longer than that of the work catcher 405, and even when the work anti-fall member 403 is pressed up in the extracting direction of the metal ring 1, the space between the front end of the work catcher 405 and the front surface 402 of the ring extracting mechanism 16 is greater than a thickness of the metal ring 1.

Figure 17B:
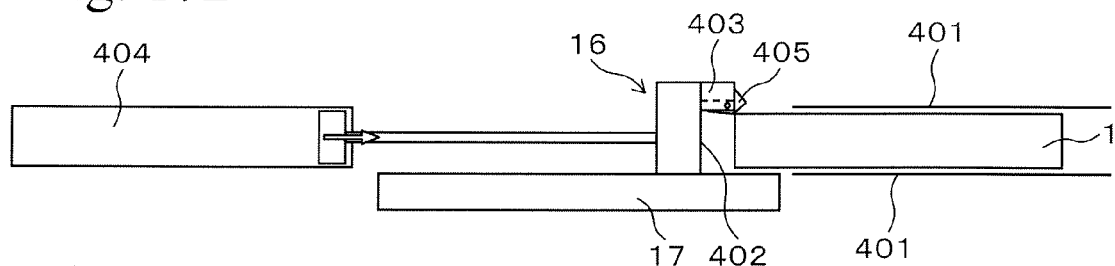
Figure 17C:
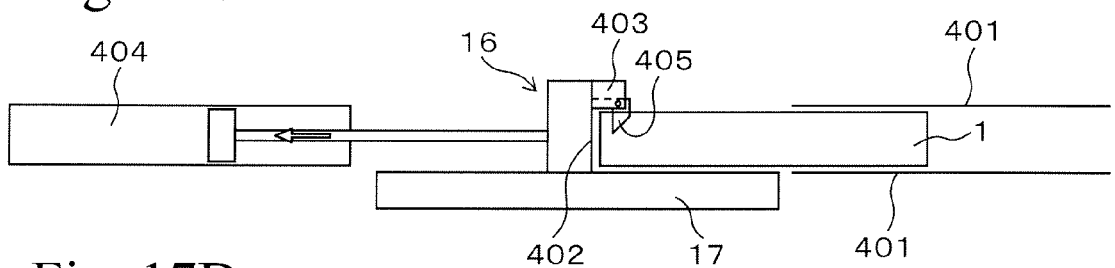

As shown in FIG. 17B, the front end of the ring extracting mechanism 16 is brought close to the end portion of the metal ring 1 by the cylinder 404, and the work catcher 405 abuts on the end portion of the metal ring 1, so that the work catcher 405 is pressed up to the upper side of the end portion of the metal ring 1. When the ring extracting mechanism 16 is brought closer to the metal ring 1 while the work catcher 405 is maintained in the pressed up condition, as shown in FIG. 17C, the front end of the work catcher 405 which is pressed up enters the inside of the metal ring 1, and the front end of the work catcher 405 falls, so that the work catcher 405 is caught at the inside of the metal ring 1.

After that, the ring extracting mechanism 16 is moved in the extracting direction by the cylinder 404, so that the metal ring 1 is extracted onto the ring receiving and passing pedestal 17. In this case, the end portion of the metal ring 1 opposite to the end portion thereof proximate to the opening 110 (that is, the end portion of the metal ring 1 which abuts on the front end surface 402 of the ring extracting mechanism 16) may start floating when the end portion of thereof proximate to the opening 110 may enter the opening 110 provided at the shelf member 401 of the alignment stocker 14. However, since the work anti-fall member 403 is provided on the upper surface of the end portion of the metal ring 1 which starts floating, this floating of the metal ring 1 is inhibited, and the metal ring 1 is extracted from the space between the shelf members 401 while the metal ring 1 is maintained in the condition parallel to the shelf members 401.

Figure 17D:
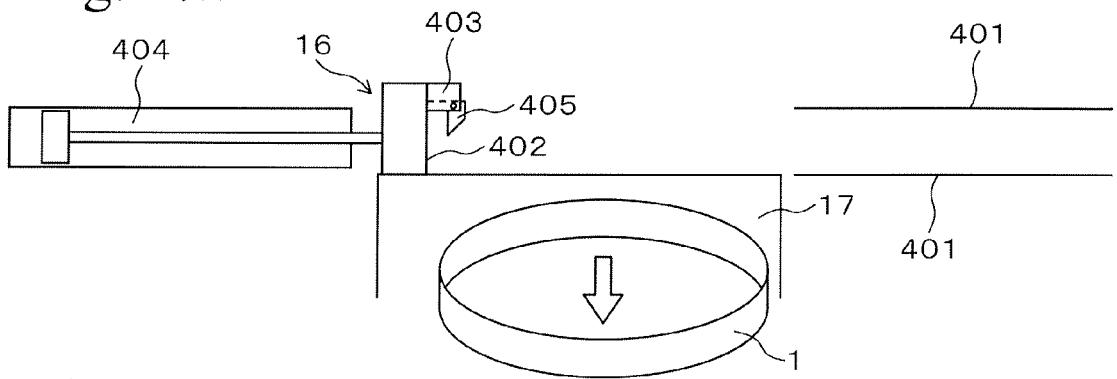
Figure 17E:
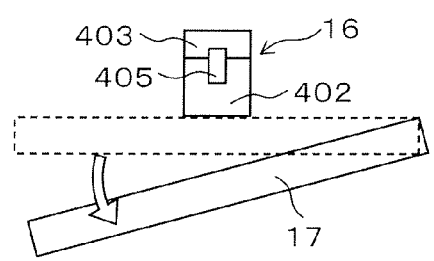

Next, as shown in FIGS. 17D and 17E, the ring receiving and passing pedestal 17 is structured so as to be inclined in a direction perpendicular to the extracting direction. Thus, the ring receiving and passing pedestal 17 is inclined, so that the work catcher 405 is removed from the inside of the metal ring 1, the metal ring 1 is slipped down to the metal ring transfer conveyor 18, and the metal ring 1 is transferred to the next process by the metal ring transfer conveyor 18.

EXPLANATION OF REFERENCE NUMERALS

Reference numeral 1 denotes a metal ring, 2 denotes a metal ring transfer conveyor, 3 denotes a ring receiving and passing pedestal, 4 denotes a ring alignment mechanism, 5 denotes an alignment stocker, 6 denotes an alignment ring transfer robot hand, 7 denotes a heat treatment jig, 8 denotes a jig transfer robot, and 9 denotes a jig mounting pallet.

The invention claimed is:

1. An automatic heat treatment method for metal rings having elasticity, comprising:
   a step for pushing the metal rings into each of plural shelf members of an alignment stocker in a horizontal direction, wherein the plural shelf members are parallel to each other in a vertical direction and spaced a predetermined interval from each other, so that the metal rings pushed into each of the plural shelf members, respectively, are aligned in a vertical direction, and each of the plural shelf members has an opening having an inner periphery of which total sides are longer than a periphery of each metal ring, so that the openings are aligned in a vertical direction;

a step for deforming each of the metal rings into a polygonal shape, which allows all of the metal rings to pass through the opening, by vertically inserting finger members into the centers of the aligned metal rings via the openings of the shelf members, and by expanding the finger members in a radial direction, respectively, so as to press and hold the insides of the metal rings, wherein the finger members extend in a vertical direction and can be expanded and contracted in a radical direction of the metal rings;

a step for pulling all of the aligned metal rings in the polygonal shape out through the openings of the alignment stocker in a vertical direction by vertically moving the finger members while pressing and holding the insides of the metal rings;

a step for transferring all of the aligned metal rings into each of the plural shelf members of a heat treatment jig by vertically inserting the finger members in which the aligned metal rings are held, into openings of the shelf members of the heat treatment jig, by contracting the finger members in a radial direction, so as to release the pressing and holding from the insides of the metals rings, and by vertically removing the finger members, after all of the aligned metal rings, which are deformed into the polygonal shape and pulled out of the alignment stocker, are inserted in a vertical direction from openings on the plural shelf members of the heat treatment jig into the heat treatment jig, wherein the plural shelf members of the heat treatment jig have the same structure as that of the plural shelf members of the alignment stocker;

a step for heating the aligned metal rings and the heat treatment jig;

a step for transferring all of the metal rings that are aligned in each of the plural shelf members of the heat treatment jig to the shelf members of the alignment stocker in a reverse manner of the transferring step from the alignment stocker to the heat treatment jig; and a step for pulling each of the metal rings out of the shelf members of the alignment stocker, wherein when a pushing direction front end of the metal ring or a pulling direction rear end of the metal ring passes on the opening of shelf member, a pushing direction rear end of the metal ring or a pulling direction front end of the metal ring is prevented from floating.

2. An automatic heat treatment method for metal rings, according to claim 1, wherein the opening has a hexagonal shape.

3. An automatic heat treatment method for metal rings, according to claim 1, wherein the shelf members can move the predetermined interval in an upper direction and a lower direction.

* * * * *